United States Patent
Argillier et al.

[11] Patent Number: 6,148,932
[45] Date of Patent: Nov. 21, 2000

[54] DRILLING METHOD AND SYSTEM USING FOAM—FOAMING COMPOSITION

[75] Inventors: Jean-François Argillier, Suresnes; Annie Audibert-Hayet, Croissy sur Seine; Sabine Zeilinger, Saint Germain en Laye, all of France

[73] Assignee: Institut Francias du Petrole, Rueil Malmaison Cedex, France

[21] Appl. No.: 09/194,732

[22] PCT Filed: Mar. 23, 1998

[86] PCT No.: PCT/FR98/00577

§ 371 Date: Dec. 2, 1998

§ 102(e) Date: Dec. 2, 1998

[87] PCT Pub. No.: WO98/44071

PCT Pub. Date: Oct. 8, 1998

[30]   Foreign Application Priority Data

Apr. 3, 1997  [FR]  France .................................... 97 04188

[51] Int. Cl.[7] .............................. C09K 7/00; E21B 21/00
[52] U.S. Cl. ............................................. 175/65; 166/312
[58] Field of Search ................................... 507/103, 203; 175/65, 69; 166/311, 312

[56]   References Cited

U.S. PATENT DOCUMENTS

| | | | |
|---|---|---|---|
| 3,463,231 | 8/1969 | Hutchison et al. | 166/303 |
| 4,016,932 | 4/1977 | Kalfoglou | 166/303 |
| 4,120,358 | 10/1978 | Kalfoglou | 166/275 |
| 4,681,164 | 7/1987 | Stacks | 166/304 |
| 5,080,809 | 1/1992 | Stahl et al. | 252/8.554 |
| 5,167,281 | 12/1992 | Kalfoglou | 166/275 |
| 5,385,206 | 1/1995 | Thomas | 166/269 |
| 5,874,386 | 2/1999 | Chan et al. | 507/211 |

FOREIGN PATENT DOCUMENTS 1192395A  10/1959  France .

*Primary Examiner*—David Bagnell
*Assistant Examiner*—Jennifer R. Dougherty
*Attorney, Agent, or Firm*—Millen, White, Zelano & Branigan, P.C.

[57]   ABSTRACT

The invention concerns a method for underground mining comprising the following steps: circulating in a well a foaming composition containing surfactants with cloud point higher than the temperature of the underground formation, heating the composition returning from the bottom to a temperature higher than the cloud point. The invention also concerns a system and a foaming composition based on water for implementing the method. The invention is useful for drilling and oil well completion operations requiring the use of a low-density fluid.

11 Claims, 2 Drawing Sheets

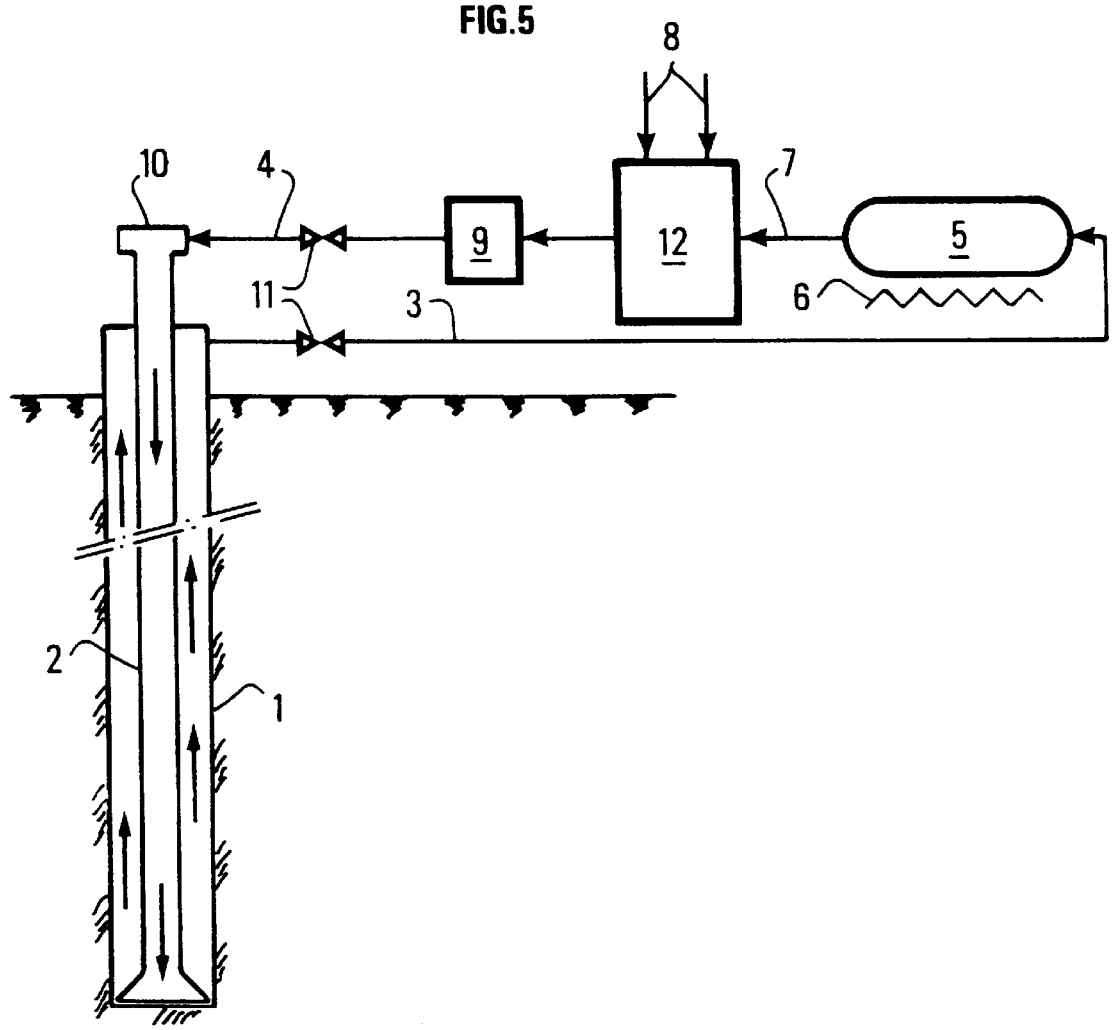

DRILLING METHOD AND SYSTEM USING FOAM— FOAMING COMPOSITION

BACKGROUND OF THE INVENTION

The invention relates to a method and to a system intended for drilling and cleaning operations in underground working wells or for bringing in operations in the case of a reservoir. In the method, circulation between the ground surface and the well bottom and return to the surface are performed from a string of pipes lowered into the well. The foam is generally injected through the inside of the pipes and it returns through the annular space defined by the pipes and the walls of the well. The fluid in the form of foam carries the cuttings along to the surface, thus cleaning the wall face. This technique, referred to as foam drilling, is well-known and has notably the advantage of not generating too high a bottomhole pressure thanks to the low density of the foam. However, the main drawback of this technique is that it does not allow ready recycling of the foaming solution, in view of the products initially brought into solution to stabilize the foam after stirring and gas injection. <<Breaking>> of the foam is the basic problem if one wishes to recover most of the foaming products for repeated use, or if the environment conditions do not allow spreading of the volume of foam returning from the well.

Document WO-94/17,154 proposes using an amphoteric foaming agent combined with surfactants as the base for a stable foaming composition. The foam is broken by a suitable variation of the pH value of the foam. If the foam is basic, it is broken by decreasing the pH value at least below 4, and if the foam is acid, it is broken by raising the pH value at least above 9.5.

SUMMARY OF THE INVENTION

The present invention concerns a drilling process using a foam obtained from a foaming aqueous solution comprising non-ionic surfactants. The foaming solution has a critical temperature referred to as <<cloud point temperature>> or <<cloud point>>.

The cloud point is a characteristic temperature for a solution comprising at least one non-ionic surfactant. The cloud point temperature is known by noting the temperature at which a cloudiness appears in the solution or by knowing the cloud point of the surfactant contained in the solution, the cloud point of the solution being the cloud point of the surfactant. In case of a mixture of two non-ionic surfactants, the cloud point is the average of the cloud points of each of the two components.

It is well-known that, when the temperature of a solution is raised above the cloud point temperature, the homogeneous and isotropic solution divides into two homogeneous and isotropic phases: a phase rich in surfactant and a phase poor in non-ionic surfactant.

The present invention thus concerns a method for circulating a foam in a well, comprising the following stages:

forming a foam from an aqueous composition comprising at least one additive whose cloud point temperature and concentration are such that the cloud point temperature of said composition is higher than the temperature of the foam during drilling, injecting said foam into the well, said foam circulating from the surface to the well bottom, then from the bottom to the surface, raising the temperature of the foam that has returned to the surface to a temperature at least higher than said cloud point temperature of the composition, so as to destabilize the foam.

In the method, the additive can be a non-ionic surfactant.

The cloud point temperature of the composition can be raised by adding a determined amount of an ionic surfactant.

The cloud point temperature of the composition can be adjusted by adding a determined amount of electrolytes.

The invention also concerns a foaming composition for use in a well drilled in the ground. The composition comprises in combination at least one non-ionic surfactant and an additive consisting of an ionic surfactant, an electrolyte or a mixture thereof, the non-ionic surfactant and said additive having a determined structure and concentration so as to adjust the cloud point temperature of said composition in relation to the temperature of said well.

A viscosifying agent can be added to the composition.

The invention further concerns a system for circulating a foam in a well drilled in the ground, comprising:

means for forming a foam from an aqueous composition comprising at least one additive whose cloud point temperature and concentration are such that the cloud point temperature of said composition is higher than the temperature of the foam in the well, means for injecting said foam into the well, said foam circulating from the surface to the well bottom, then from the bottom to the surface.

The system comprises means for heating the foam that has returned to the surface to a temperature at least higher than said cloud point temperature of the composition so as to destabilize the foam.

The cloud point of a non-ionic surfactant solution depends on the surfactant concentration and on the other possible additives (other surfactants, electrolytes, organic polar components or alcohols). The cloud point also depends on molecular changes: chain length, branching, . . . In the present invention, the cloud point temperature of a solution is thus adjusted according to the field of application.

When adding small amounts of ionic surfactant (sodium dodecyl sulfate SDS for example), the electrostatic repulsion between the surfactant micelles increases, which leads to a cloud point temperature increase.

When adding electrolytes, the cloud point temperature of the solution can increase or decrease according to the type of electrolyte used (salting in or salting out effect of the cations or anions). By way of example, if NaCl or CaCl2 is added, the cloud point temperature decreases, whereas with LiNO3, the temperature increases. The following document can be mentioned by way of reference: <<Salt effects on solutions of non-ionic surfactants and its influence on the stability of polymerized microemulsions>>, by C. Holzcherer and F. Candau, Journal of Colloid and Interface Science, Vol.125, No.1, pp.97–110 (1988).

The cloud point can also be modified by an increase in the molecular mass of the surfactant, by branching of hydrophobic parts, or by the distribution of the hydrophobic chain lengths in the molecule.

All the well-known conventional non-ionic surfactants can be used as surfactants according to the present invention.

The non-ionic surfactants can be classified according to the kind of linkage between the hydrophobic part and the hydrophilic part of the molecule. This kind of linkage can be an ether bridge, an ester bridge, an amide bridge, or others: Ether-bridged non-ionic derivatives for example:

Oxyethylated fatty alcohols,
Oxyethylated alkylphenols,
Oxyethylated-oxypropylated products,
Glucose ethers.

Ester-bridged non-ionic surfactants for example:
Glycerol esters,
Polyethylene glycol esters,
Sorbitane esters,
Sugar esters.

Amide-bonded non-ionics:
Diethanolamides.

Other non-ionics:
Ethoxylated fatty amines for example.
Ethoxylated alkanolamides, ethoxylated amines, ethylene or propylene oxide block copolymers can also be mentioned.

An ethoxylated octylphenol with an ethylene oxide chain length of 9 to 10 (Triton-X-100) or with an ethylene oxide chain length of 7 to 8 (Triton-X-114) (tradename of surfactants manufactured by Union Carbide—USA) with a cloud point of 67° C. and 25° C. respectively can be used in the present invention. For higher bottomhole temperatures, Triton-X-102 with a chain length of 12 to 13 (cloud point 88° C.), Triton-X-165 with a chain length of 16 (cloud point above 100° C.) or a mixture of Triton-X-100 and of $7.5 \cdot 10^{-5}$ mol/l of SDS (cloud point 73° C.) can be used.

The cloud point temperature is varied by varying the length of the hydrophobic group and of the hydrophilic group of the surfactant.

An additive intended to raise the cloud point can preferably be a sodium dodecyl sulfate (SDS) type surfactant.

An additive intended to adjust the cloud point can be sodium chloride (NaCl).

The foaming solution can contain a polymer intended to increase the viscosity and therefore the stability of the foam.

Like all the well fluids, the foaming solution can also contain solids or other additives (anticorrosion, etc.).

BRIEF DESCRIPTION OF THE DRAWINGS

Other features and advantages of the present invention will be clear from reading the description hereafter of non limitative tests, with reference to the accompanying drawings wherein.

DETAILED DESCRIPTION OF THE INVENTION

Figure 1:
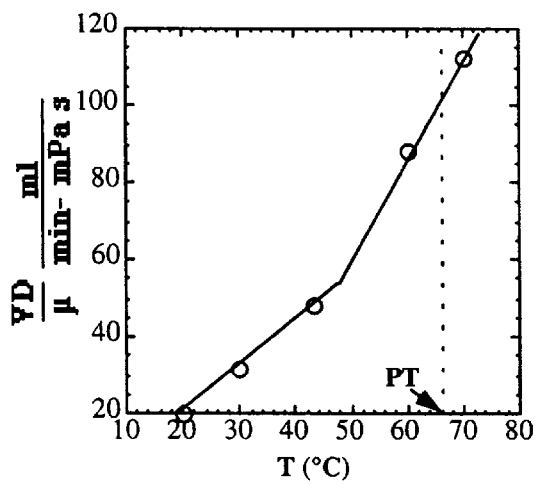
FIGS. 1 to 4 show the evolution of the drainage rate of the foam as a function of the temperature, FIG. 5 diagrammatically shows a system for implementing the present invention.

The tests are mainly based on the comparison, for non-ionic surfactants and possibly at least one cloud point temperature control additive, of the following two measurements taken on the foaming solution or on the foam formed from said foaming solution:

the drainage rate VD, which allows to characterize the stability of the foam formed as a function of the temperature, the viscosity $\mu$ (mPa.s) of the foaming solution, in order to check that the increase in the drainage rate is not mainly due to a viscosity variation of the foaming solution.

Operating Method

The foaming solution consists of a mixture of at least one non-ionic surfactant at a concentration of 1% and, in some cases, of an ionic surfactant at a variable concentration. The viscosity of the foaming solution as a function of the temperature is measured with the aid of conventional means for such measurement. The viscosity values are shown in the tables relating to tests 1 to 4. The foam is obtained from 200 ml of foaming solution by stirring by means of a whip. The rotating speed is about 2,000 rpm. Stirring lasts for 2 minutes. When the tests are carried out at a higher temperature than ambient temperature, the foaming solution and the glass container are heated to the test temperature in a stove. Stirring is performed at ambient temperature. The foam formed is poured into a graduated glass funnel, and the funnel is placed in the stove, preheated to the test temperature. The temperature of the foam is difficult to adjust because it has a good thermal insulation. The temperature of the foam is measured here by means of a thermocouple directly in contact with the foam.

The volume of solution drained as a function of time is noted. The stability of the foam is characterized by the drainage rate VD. The drainage rate is defined from the empirical equation describing the drained volume V as a function of time (Bikerman, J. J., 1973):

$$V = V_0(1 - \exp(-kt))$$

V: the drained volume (cm$^3$)
$V_0$: the volume of foaming solution (cm$^3$)
t: time (min)

$$VD = kV_0/2 \ (cm^3/min).$$

A low value of VD means that the foam is stable.

Graphs 1 to 4 representing tests 1 to 4, with the temperature in Celsius degree as abscissa and the VD/$\mu$ ratio (cm$^3$/min.mPa.s) as ordinate, have been drawn in order to take partly into account the viscosity decrease as a function of the temperature.

Definition of the Systems Tested

Surfactants

Ethoxylated octylphenol:

Triton-X-100 (CPE$_{9-10}$): non-ionic surfactant of following formula:

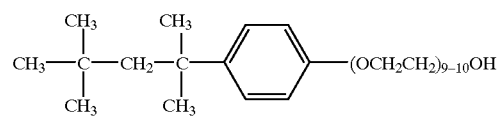

Triton-X-114 (CPE$_{7-8}$): non-ionic surfactant of following formula:

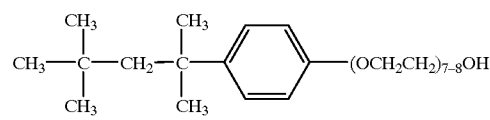

Sodium dodecyl sulfate (SDS): ionic surfactant of following formula:

Polymer:
* Carboxymethylcellulose (CMC): the average degree of substitution of carboxylic groups per cellulose cycle of the sample studied is close to 1. Its molecular mass is about 2×10$^6$ g/mol.

Test 1: Non-ionic surfactant at different temperatures

1% Triton-X-100, cloud point PT=67° C., with no other additive.

| Temperature (° C.) | Drainage rate (ml/min) | Volume of foam (cm$^3$) | Viscosity (mPa · s) | VD/$\mu$ |
|---|---|---|---|---|
| 20 | 22 | 2100 | 1.08 | 20.4 |
| 30 | 28 | 2100 | 0.88 | 31.8 |
| 43 | 36 | 2100 | 0.74 | 48.2 |
| 60 | 50 | 2100 | 0.64 | 88.1 |
| 70 | 61 | 2100 | 0.51 | 112 |

This carried out on a foaming composition comprising no other additive than the non-ionic surfactant, so as to highlight the effect of the cloud point on the stability of foam. In FIG. 1, PT stands for the value of the cloud point temperature, about 67° C. here.

It can be noted that below the cloud point, the evolution of the VD/$\mu$ ratio directly depends on the evolution of the viscosity $\mu$ but, above the cloud point, this ratio increases very appreciably, which indicates a stability loss of the foam.

Test 2: Mixture of non-ionic surfactants at different temperatures 0.5% Triton-X-100 and 0.5% Triton-X-114. Cloud point of the mixture: 48° C.

| Temperature (° C.) | Drainage rate (ml/min) | Volume of foam (cm$^3$) | Viscosity (mPa · s) | VD/$\mu$ |
|---|---|---|---|---|
| 20 | 23 | 2000 | 1.07 | 21.3 |
| 40 | 28 | 2000 | 0.79 | 35.2 |
| 60 | 43 | 2000 | 0.57 | 75.3 |

Test 2 give the drainage rate of a solution comprising Triton-X-100 (PT=67° C.) or Triton-X-114 (PT=25° C.) as a function of the temperature. It is observed that the foam stability decreases when the temperature exceeds the 48° C. cloud point PT for the mixture of Triton-X-100 and of Triton-X-114.

Figure 2:
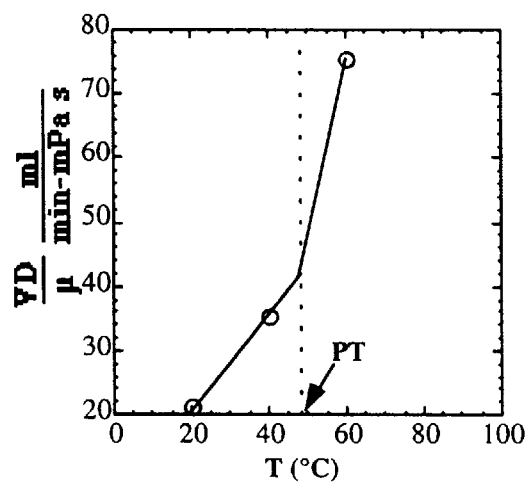

The slopes of the curve in FIG. 2 show that the foam loses stability above the cloud point of the foaming composition, which is here substantially the average of the cloud points pf the two non-ionic surfactants in admixture.

Test 3: Mixture of a non-ionic surfactant and of an ionic surfactant at different temperatures:

1% Triton-X-114 and 10$^{-4}$ mol/l of SDS, cloud point of the mixture: 35° C.

| Temperature (° C.) | Drainage rate (ml/min) | Volume of foam (cm$^3$) | Viscosity (mPa · s) | VD/$\mu$ |
|---|---|---|---|---|
| 20 | 11 | 1800 | 1.08 | 10.2 |
| 30 | 12 | 1800 | 0.88 | 13.6 |
| 59 | 13 | 1800 | 0.64 | 20.8 |
| 70 | 18 | 1800 | 0.51 | 35.4 |

Figure 3:
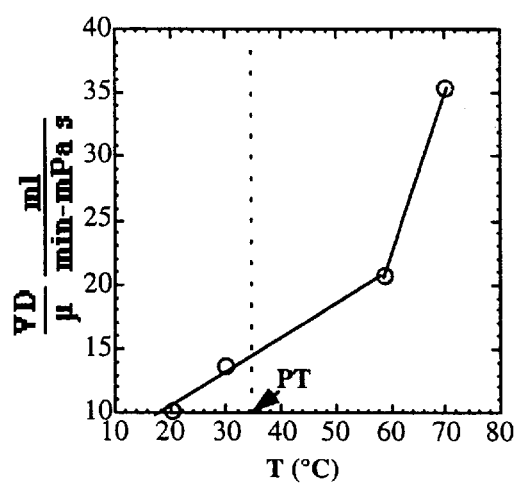
Figure 4:
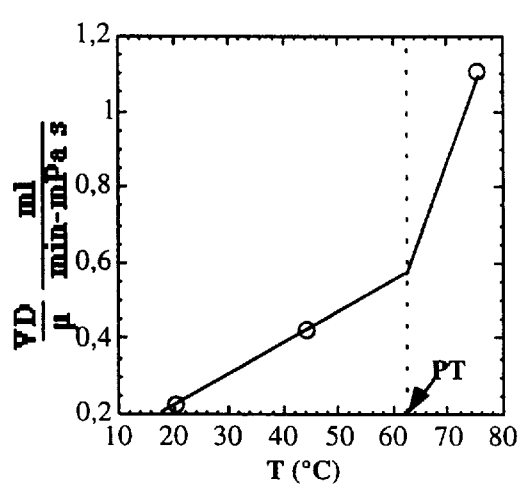

In this example, mixing a non-ionic surfactant (Triton-X-114) with a low concentration of a SDS type ionic surfactant (10 mol$^{-4}$/l) causes the cloud point temperature to rise from 25 to 35° C. When the temperature of the foam is above the cloud point, the stability of the foam decreases. In FIG. 3, the slope of the curve ends above about 50° C.

Test 4: Mixture of a non-ionic surfactant and of a polymer at different temperature:

1% Triton-X-114 and 500 ppm of CMC, cloud point: 63° C.

| Temperature (° C.) | Drainage rate (ml/min) | Volume of foam (cm$^3$) | Viscosity (mPa · s) | VD/$\mu$ |
|---|---|---|---|---|
| 20 | 5 | 1800 | 22 | 0.23 |
| 44 | 8 | 1800 | 18 | 0.43 |
| 75 | 11 | 1800 | 10 | 1.11 |

In this test, a mixture of non-ionic surfactant and of a viscosifying polymer (CMC) is used. The cloud point PT of the mixture of surfactant and polymer is about 63° C. The solution is more viscous because of the presence of the polymer, even above 50° C. It is also observed that, above the cloud point, the drainage rate increases even with a higher viscosity of the foaming composition.

FIG. 5 diagrammatically shows a system for implementing the method and the foaming composition according to the present invention.

Reference number 1 refers to a well drilled in the subsoil. Reference number 2 refers to a string of pipes lowered in well 1. This string can be a drill string, a casing pipe or a tubing. The invention relates to all the pipes that can be lowered into a well, including coiled tubings. The arrows show an example of circulation of a fluid (foam in the present case) in a well. At the wellhead, a flowline 3 collects the foam that returns to the surface through the annulus in order to send it to a foam <<breaking >> installation 5 comprising means 6 for heating the foam and for collecting the liquid obtained after destabilization of the foam. The liquid is then sent, through line 7, to a foaming composition separation, preparation and/or regeneration installation 12. Additional fluid and additive supplies are schematized by arrows 8. It is in this installation 12 that the foaming composition is separated from the solids from well 1 that are carried along to the surface by the foam. The quality of the foaming composition is also controlled so that it can be used for another circulation cycle in the well.

The foaming composition is then sent to pumping and injection means 9 conventionally used for injecting foam into well 1 through line 4 and swivel 10 fastened to string 2.

Symbols 11 refer to line shutoff valves.

The direction of circulation of the foam in the well can of course be a <<counterflush >> circulation, as it is well-known in the trade, i.e. the foam is injected into the annulus through line 3 and comes back up to the surface through string 2 and line 4. A manifold controls the return of the foam to installation 5, line 3 being connected to installation 9.

The foam drilling system works as follows:

The foaming composition is injected through device 9 with gas in swivel 10. The pressurized foam flows down through string 2 and flows out at the level of the well bottom. The foam expands and swells notably according to the bottomhole pressure. The temperature of the foam tends to reach the temperature of the well. The foam flows back up through the pipe/well annulus by carrying cuttings along in case of a drilling phase. For the foam to be efficient for well cleaning, the temperature reached by the foam at the well bottom must be lower than the cloud point temperature of the foaming solution. After coming back to the surface through line 3, the foam is sent to foam <<breaking >> means 5 according to the method of the present invention. At the outlet, the gas is discharged and an aqueous solution is sent to device 12 comprising notably means for separating the solids and/or the gases contained in a liquid phase: hydrocyclone, degasser, decanter, screen, . . . The quality of the aqueous phase collected is controlled with the aid of measuring means in order to use it for a new cycle.

What is claimed is:

1. A method of circulating a foam in a well, wherein the following stages are carried out:

forming a foam from an aqueous composition comprising at least one additive whose cloud point temperature and concentration are such that the cloud point temperature of said composition is higher than the temperature of the foam in the well during drilling, injecting said foam into the well, said foam circulating from the surface to the well bottom, then from the bottom to the surface, heating the foam that has returned to the surface to a temperature at least higher than said cloud point temperature of the composition so as to destabilize the foam.

2. The method as claimed in claim 1, wherein said additive is a non-ionic surfactant.

3. The method as claimed in claim 2, wherein the cloud point temperature of said composition is raised by adding a determined amount of an ionic surfactant.

4. The method as claimed in claim 2, wherein the cloud point temperature of said composition is adjusted by adding a determined amount of electrolytes.

5. The method according to claim 2, wherein said non-ionic surfactant is an ethoxylated phenol.

6. A method according to claim 1, wherein said aqueous composition comprises in combination at least one non-ionic surfactant and an ionic surfactant, an electrolyte or a mixture thereof, said non-ionic surfactant and said additive having a determined structure and concentration so as to adjust the cloud point temperature of said composition in relation to the temperature of said well.

7. A method according to claim 6, wherein said composition further comprises a viscosifying agent is added.

8. A method according to claim 6, wherein said aqueous composition comprises an ethoxylated phenol and sodium dodecyl sulfate.

9. The method according to claim 8, wherein said aqueous solution further comprises carboxymethylcellulose.

10. The method according to claim 1, further comprising separating gas from the resultant destabilized foam, separating a liquid phase from the destabilized foam, separating at least one of solids and residual gases from said liquid phase, and measuring the quality of the resultant separated aqueous phase.

11. A system for circulating a foam in a well (1) drilled in the ground, comprising:

means (9) for forming a foam from an aqueous composition comprising at least one additive whose cloud point temperature and concentration are such that the cloud point temperature of said composition is higher than the temperature of the foam when it is in the well, means (10, 2) for injecting said foam into the well, said foam circulating from the surface to the well bottom, then from the bottom to the surface, comprising means (5) for heating the foam that has returned to the surface to a temperature at least higher than said cloud point temperature of the composition so as to destabilize the foam.

* * * * *